K. VON KANDO.
SUPPORTING DEVICE FOR TROLLEY WIRES OF ELECTRIC RAILWAYS.
APPLICATION FILED OCT. 2, 1908.

946,135.

Patented Jan. 11, 1910.
2 SHEETS—SHEET 1.

WITNESSES

INVENTOR
KALMAN VON KANDO
By Gifford & Bull
HIS ATTORNEYS

K. VON KANDO.
SUPPORTING DEVICE FOR TROLLEY WIRES OF ELECTRIC RAILWAYS.
APPLICATION FILED OCT. 2, 1908.

946,135.

Patented Jan. 11, 1910.

UNITED STATES PATENT OFFICE.

KALMAN VON KANDO, OF VADO LIGURE, ITALY, ASSIGNOR TO GEORGE WESTINGHOUSE, OF PITTSBURG, PENNSYLVANIA.

SUPPORTING DEVICE FOR TROLLEY-WIRES OF ELECTRIC RAILWAYS.

946,135.

Specification of Letters Patent.   Patented Jan. 11, 1910.

Application filed October 2, 1908. Serial No. 455,934.

*To all whom it may concern:*

Be it known that I, KALMAN VÓN KANDO, a subject of the Emperor of Austria-Hungary, and a resident of Vado Ligure, Italy, have invented new and useful Improvements in Supporting Devices for the Trolley-Wires of Electric Railways, of which the following is a specification.

In my British patent No. 9341 of 1906 a system of suspension for the trolley wires at the curves of electric railways is described in which two or more pivoted rods are connected to an attachment member in such a manner that the movement of the point of suspension of the trolley wire always takes place in an approximately vertical direction so as to prevent lateral vibration of the conductor wire while permitting free vertical play thereof owing to the upward thrust of the current collector on the car. When constructing this suspension device it is necessary that the suspension rods, when prolonged, shall meet in a point on the same horizontal level as the point of attachment of the trolley wire.

My present invention is an improvement of this method of suspension and is especially applicable to the catenary method of suspension.

In my earlier invention the supporting rods are relatively long and the attachment member connecting these rods to the trolley wire is comparatively short. In consequence of this arrangement the point of attachment of the trolley wire is considerably outside the vertical plane parallel to the trolley wire passing through the points where the rods are fixed to the supporting arm. According to the present invention, however, a system of suspension is provided in which the supporting rods are made shorter and a longer attachment member is employed inclined downward to a point vertically below the point where the rods are supported. By this means it is possible to suspend the trolley wire immediately below the upper point of attachment of the support. One advantage of this arrangement is that when the catenary method of suspension is employed the rods may be attached to the same insulators which serve for supporting the suspension cable, so that the number of insulators required is reduced.

Figure 1:
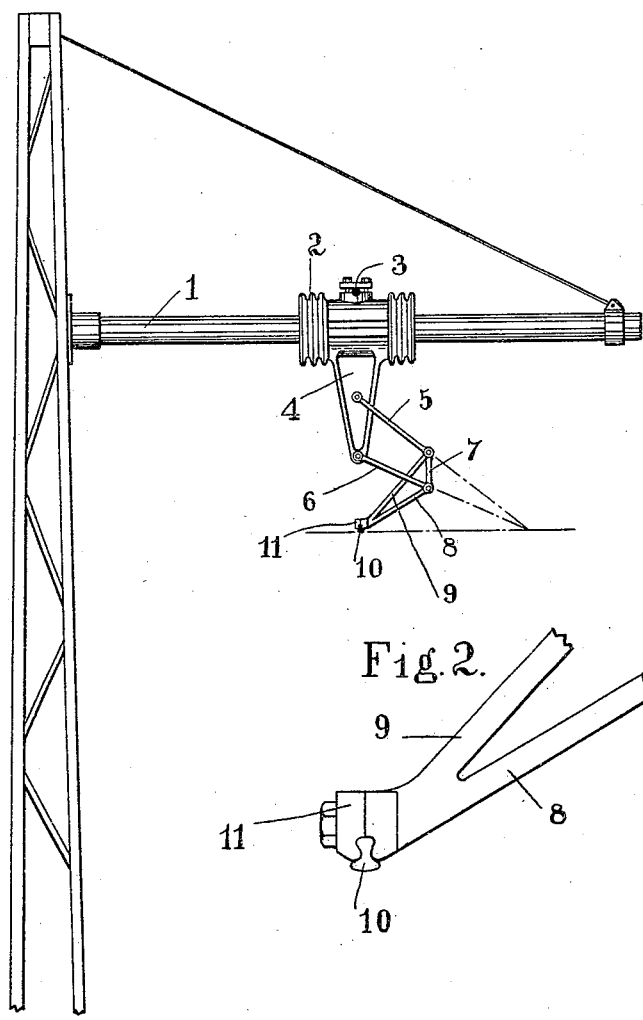
Figure 2:
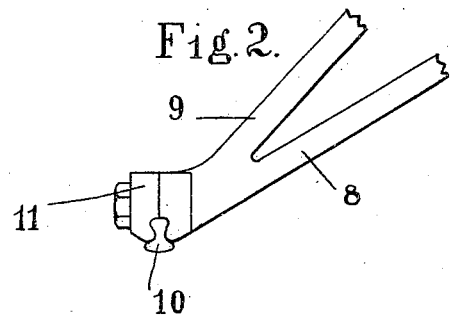
Figure 3:
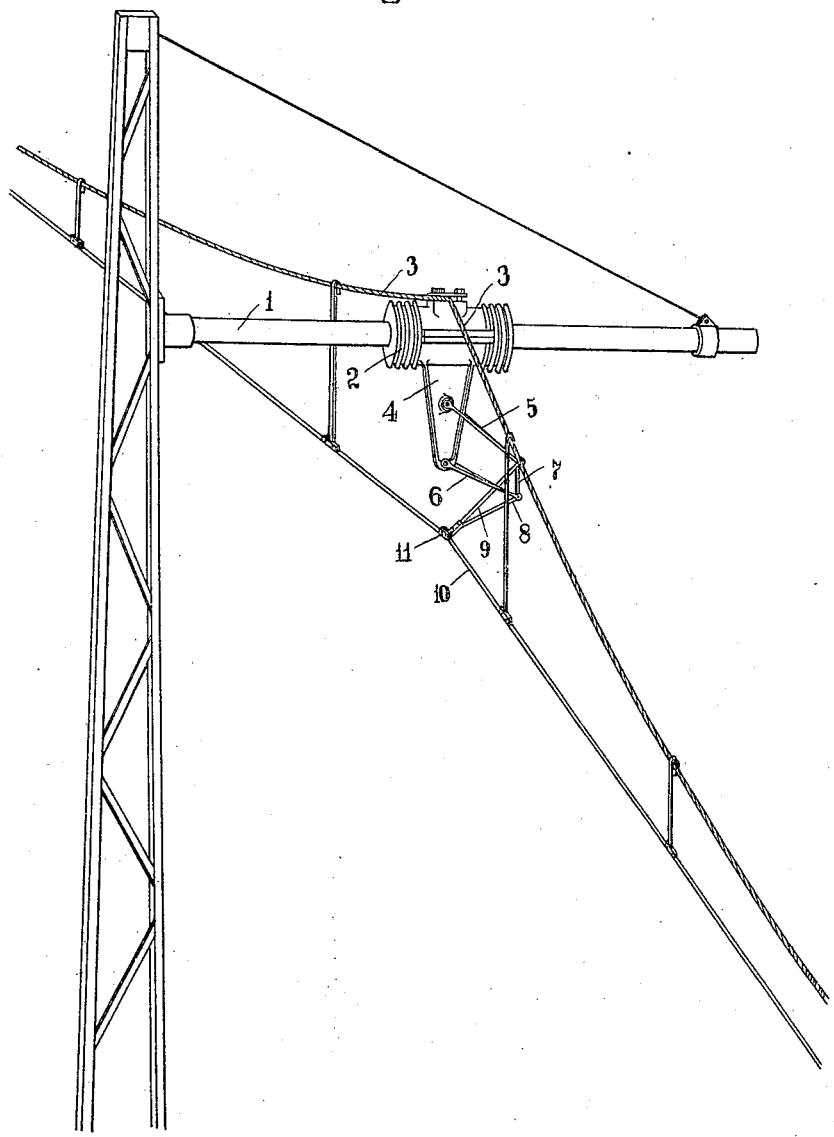

In the accompanying drawings:—Figure 1 is a view in elevation of my improved suspension device. Fig. 2 is a detail view showing the method of fixing the trolley wire to the attachment member. Fig. 3 being a view showing the supporting messenger cable and its conducting wire in perspective.

The arm 1 carries the insulator 2, in the upper part of which the suspension cable or wire 3 is held. Secured to or forming part of the insulator is a metal plate 4 on which the rods 5 and 6 are pivoted so as to rotate in substantially the same vertical plane as that which contains the metal piece 4. The attachment member 7—8—9 of substantially triangular form is pivotally connected to the free ends of rods 5 and 6. If the rods 5 and 6 are prolonged, the lines meet in a point on the same horizontal level as the point of attachment of the trolley wire. The point of attachment 10 is fixed to the attachment trolley wire 10 is fixed to the attachment piece 7—8—9 by means of the clamp 11 shown on an enlarged scale in Fig. 2.

Although my invention is particularly adapted for use in a catenary suspension system it is not limited in this respect but may be utilized in other systems for supporting trolley wires.

Having now described my invention what I claim as new and desire to secure by Letters Patent of the United States is:—

1. In a supporting device for the trolley wires of electric railways comprising the combination of a supporting arm, an insulator carried on said supporting arm, rods pivoted on said insulator, said rods when prolonged meeting in a point on the same level as the point of attachment of the trolley wire and an attachment piece pivoted to the free ends of said rods, the trolley wire being fixed to the lower extremity of said attachment piece.

2. A supporting device for the trolley wires of electric railways comprising the combination of a supporting arm, an insulator carried on said supporting arm, a suspension cable carried on said insulator, rods pivoted to said insulator which rods would if prolonged meet in a point on the same level as the point of attachment of the trolley wire and an attachment piece pivoted to the free ends of said rods, to the lower extremity of which the trolley wire is attached.

3. A supporting device for the trolley wires of electric railways comprising a combination of a supporting arm, an insulator carried on said supporting arm, a suspension cable carried on said insulator, a plate fixed to said insulator, rods pivoted on said plate and an attachment piece pivoted to the free ends of said rods, the free end of said attachment piece where the trolley wire is secured being on the same level as the point of intersection of the rods when prolonged.

4. A supporting device for the trolley wires of electric railways comprising the combination of a supporting arm, an insulator carried on said supporting arm, a suspension cable carried on said insulator, a metal plate fixed to said insulator, a plurality of rods pivoted on said metal plate in the same vertical plane, an attachment piece pivoted to the free ends of said rods, the end of said attachment piece being on the same level as the point of intersection of the rods when prolonged, and a clamp adapted to secure the trolley wire to the lower extremity of said attachment piece.

In testimony whereof, I have hereunto subscribed my name this 19th day of September 1908.

KALMAN VON KANDO.

Witnesses:
 GIACOMO VICLLO,
 C. A. FERRAR.